United States Patent
Ledieu et al.

(10) Patent No.: US 10,166,818 B2
(45) Date of Patent: Jan. 1, 2019

(54) SNOW TIRE TREAD COMPRISING INCISIONS AND CAVITIES

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Vincent Ledieu, Clermont-ferrand (FR); Bertrand Fraenkel, Clermont-ferrand (FR); Illyes Batnini, Clermont-ferrand (FR); Marie-Helene Vantal, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 0 days.

(21) Appl. No.: 14/647,975

(22) PCT Filed: Nov. 22, 2013

(86) PCT No.: PCT/EP2013/074430
§ 371 (c)(1),
(2) Date: May 28, 2015

(87) PCT Pub. No.: WO2014/082922
PCT Pub. Date: Jun. 5, 2014

(65) Prior Publication Data
US 2015/0306915 A1    Oct. 29, 2015

(30) Foreign Application Priority Data
Nov. 29, 2012 (FR) ...................... 12 61417

(51) Int. Cl.
  B60C 11/11 (2006.01)
  B60C 11/12 (2006.01)
  B60C 11/03 (2006.01)

(52) U.S. Cl.
  CPC ........ B60C 11/032 (2013.01); B60C 11/0323 (2013.01); B60C 11/1218 (2013.01);
  (Continued)

(58) Field of Classification Search
  CPC ............. B60C 11/1218; B60C 11/0323; B60C 11/1281; B60C 11/032; B60C 2011/129; B60C 2011/1254
  See application file for complete search history.

(56) References Cited

U.S. PATENT DOCUMENTS 4,994,126 A  *  2/1991  Lagnier .............. B29D 30/0606
                                                152/209.18
5,316,063 A  *  5/1994  Lagnier .................. B60C 11/11
                                                152/209.18

(Continued)

FOREIGN PATENT DOCUMENTS

DE    102009044242 A1  *  5/2011
EP        0543267         5/1993
(Continued)

OTHER PUBLICATIONS

Machine translation for Japan 62-268707 (no date).*
(Continued)

*Primary Examiner* — Steven D Maki
(74) *Attorney, Agent, or Firm* — Dickinson Wright PLLC

(57) ABSTRACT

A snow tire tread having a plurality of blocks separated by grooves and provided with sipe incisions dividing into several parts from a certain depth onwards, (complex sipes each having, when viewed in cross section, a rectilinear first part extending radially from the tread surface of the tread, (Continued)

and a second part extending the first part and comprising at least two branches each having an end. The tread has cavities each extending between the branches of a complex sipe and having a bottom situated at the same level as the ends of the branches. The cavities and the grooves of the tread are configured so that this tread has a voids surface ratio at the end of wear greater than or equal to 35%. Furthermore, the distance (D) between two branches of two adjacent complex sipes is at least equal to 2 mm.

10 Claims, 4 Drawing Sheets

(52) U.S. Cl.
CPC ...... *B60C 11/1236* (2013.01); *B60C 11/1281* (2013.01); *B60C 2011/129* (2013.01); *B60C 2011/1209* (2013.01); *B60C 2011/1254* (2013.01)

(56) References Cited

U.S. PATENT DOCUMENTS

| | | | | |
|---|---|---|---|---|
| 6,193,492 | B1 * | 2/2001 | Lagnier | B29C 33/48 152/DIG. 3 |
| 6,318,983 | B1 * | 11/2001 | Lopez | B29C 33/301 425/28.1 |
| 6,454,554 | B1 * | 9/2002 | Lopez | B29C 33/44 425/28.1 |
| 2006/0005905 | A1 * | 1/2006 | Croissant | B60C 11/0302 152/154.2 |
| 2008/0149237 | A1 * | 6/2008 | Cambron | B60C 1/0016 152/154.2 |
| 2010/0193096 | A1 * | 8/2010 | Hashimoto | B60C 11/12 152/209.18 |
| 2011/0139325 | A1 * | 6/2011 | Janesh | B60C 11/0302 152/209.25 |
| 2012/0048439 | A1 | 3/2012 | Christenbury | |
| 2013/0206291 | A1 * | 8/2013 | Emorine | B60C 11/24 152/154.2 |

FOREIGN PATENT DOCUMENTS

| | | | |
|---|---|---|---|
| FR | 2962373 A1 | * | 1/2012 |
| GB | 1265652 A | * | 3/1972 |
| JP | 62-268707 A | * | 11/1987 |
| JP | 03-094305 U | * | 9/1991 |
| JP | 06-183217 A | * | 7/1994 |
| JP | H09277805 | | 10/1997 |
| JP | 2001-191741 A | * | 7/2001 |
| JP | 2007-106175 A | * | 4/2007 |
| JP | 2008-001219 A | * | 1/2008 |
| WO | 2010144091 | | 12/2010 |

OTHER PUBLICATIONS

Machine translation for Japan 2001-191741 (no date).*
Machine translation for German 102009044242 (no date).*
Machine translation for Japan 2007-106175 (no date).*
Machine translation for Japan 06-183217 (no date).*
Partial machine translation for JP 03-094305 U (no date).*
Machine translation for JP 2008-001219 (no date).*
International Search Report for PCT/EP2013/074430 dated Jan. 27, 2014.

* cited by examiner

SNOW TIRE TREAD COMPRISING INCISIONS AND CAVITIES

This application is a 371 national phase entry of PCT/EP2013/074430, filed 22 Nov. 2013, which claims benefit of French Patent Application No. 1261417, filed 29 Nov. 2012, the entire contents of which are incorporated herein by reference for all purposes.

BACKGROUND

Field

The present disclosure relates to a tread for a tire of the snow tire type. More particularly, the disclosure relates to a snow tire having improved end-of-life grip performance.

Description of Related Art

A tire for winter driving, referred to as a snow tire, comprises in the way known per se a tread that is provided with a plurality of sipe incisions. This addition of sipes to the tread of a tire has notably been disclosed in document FR759592 and its addition FR43383.

The sipes delimit on the tread blades of rubber which have edge corners capable of biting into the snow when driving on snowy surfaces, thus improving grip on this road surface. The action of the edge corners on the road surface is all the greater when the tread is new. This is because in that condition, the blades of rubber have a high slenderness ratio, that is to say a great height for a small width relative to this height. Thus, as the blades enter the contact patch in which the tire is in contact with the road surface these blades tilt. The pressures that the edge corners of the blades apply to the road surface are therefore increased. Such a phenomenon is notably illustrated in FIG. 3 of document FR2418719.

With tread wear, the height of the blades decreases and the deformation of these blades, as they enter the contact patch, likewise decreases. As a result, the biting effect of the edge corners decreases with tread wear.

In order to maintain good grip of a snow tire, even at an advanced level of wear, document EP0378090 has proposed providing the tread of this tire with complex sipes which duplicate from a certain depth onwards. Viewed in cross section, each of these sipes has a rectilinear first part extending radially into the tread and a second part extending the first part and comprising two branches. With such a configuration, the density of the sipes on the tread at the end of its life is greater than the density of the sipes of this tread at the beginning of its life, making it possible to increase accordingly the number of edge corners and therefore the grip of this tire when its wear reaches a certain level.

In order to improve the end-of-life grip of this tire still further it is possible to insert, between the complex sipes, simple sipes which extend in a rectilinear manner into the depth of the tread, as illustrated in FIG. 4 of document EP0378090. However, by increasing the number of sipes in the tread, the space occupied by the blades of rubber between these sipes is correspondingly reduced. The mechanical integrity of these blades is therefore reduced and the risk of chunking of all or part of these blades during operation of the tire is increased.

There is therefore a need to improve the grip of snow tires, notably at the end of life, while at the same time maintaining or even improving the overall mechanical strength thereof.

DEFINITIONS

A "tire" means all types of resilient tread whether or not it is subjected to an internal pressure.

A "snow tire" (or "winter tire") means a tire identified by an M+S or M.S. or even M&S inscription marked on at least one of the side walls of the tire. This snow tire is characterized by a tread design and structure which are intended first and foremost to provide, in mud and fresh or melting snow, a behaviour that is better than that of a road-type tire which is designed to run on road surfaces that are not covered with snow.

The "tread" of a tire means a quantity of rubber compound delimited by lateral surfaces and by two main surfaces, one of which is intended to come into contact with a road surface when the tire is being driven on.

A "tread surface" of a tread here means all of the points of the tread which come into contact with the ground when the tire, inflated to its reference pressure and without studs, is driving along this ground. The reference inflation pressure is defined in the conditions of use of the tire, which conditions are notably specified by the E.T.R.T.O standard.

The "wear rate" of the tread is the ratio between a thickness that the tread has lost through wear and the total thickness that the tread can lose before it has to be replaced. Thus, a wear rate of 25% means that the tread has lost one quarter of the wearable rubber compound.

The "end of wear" of the tread means that the thickness of the tread has reached the regulatory height of a wear indicator in this tread. In the case of a tire for a passenger vehicle, this regulatory height is 1.6 mm.

A "sipe" means a cut generating opposing walls of material. The distance between the walls of material of the sipe is suited to allowing these walls to come at least partially into contact as the sipe enters the contact patch in which the tire is in contact with the ground.

A "groove" means a cut generating opposing walls of material. The distance between the walls of material of the groove is such that these walls cannot come into contact with one another under normal driving conditions.

A "block" means a raised element delimited by grooves and comprising lateral walls and a contact face, the latter being intended to come into contact with a road surface during driving.

A "voids surface ratio" of a tread means the amount of voids present on the tread surface of this tread. These voids are notably generated by the grooves in the tread.

A "mould" means a collection of separating moulding elements which, when brought relatively closer together, delimit a toroidal moulding space.

A "radial direction" means a direction which is perpendicular to the axis of rotation of the tire (this direction corresponds to the direction of the thickness of the tread).

An "axial direction" means a direction parallel to the axis of rotation of the tire.

A "circumferential direction" means a direction which is tangential to any circle centred on the axis of rotation. This direction is perpendicular both to the axial and to the radial direction.

SUMMARY

The invention, in an embodiment, relates to a tread for a snow tire comprising a plurality of blocks separated by grooves. The blocks are provided with sipe incisions dividing into several parts from a certain depth onwards, referred to as complex sipes. Each complex sipe has, when viewed in cross section, a rectilinear first part extending radially from the tread surface of the tread, and a second part extending the first part and comprising at least two branches each having an end. The tread further comprises cavities, and each cavity extends between the branches of a complex sipe. Each cavity comprises a bottom situated at the same level as the ends of the branches. The cavities and the grooves of the tread are configured so that this tread has a voids surface ratio at the end of wear greater than or equal to 35%. Furthermore, the distance between two branches of two adjacent complex sipes is at least equal to 2 mm.

The invention, in an embodiment, thus proposes generating voids, from the cavities, when the tread reaches a certain level of wear. These voids will delimit ribs of rubber of a width at least equal to 2 mm, which gives these ribs good ability to withstand mechanical stresses applied by the road surface. Furthermore, the presence of voids in the tread will make it possible to create increases in pressure on the edge corners of these ribs, thus increasing the "bite" of the tire. Finally, these voids will form reservoirs capable of storing snow, thus improving the grip of the tread on a snowy road surface.

In a preferred embodiment, each cavity extends from its bottom as far as the rectilinear first part of the complex sipe flanking this cavity, this rectilinear first part extending into the tread over a depth of between 10% and 60% of the thickness of the tread in the new state.

The level of wear that triggers the appearance of the cavities on the tread surface of the tread can thus be adjusted.

In an alternative form of embodiment, the branches of the complex sipes are rectilinear and are symmetric about a plane orthogonal to the tread surface of the tread, these branches making an angle θ at most equal to 20° with this plane.

This shape of branches allows the second part of the sipe to be revealed more progressively, thus improving the overall look of the tire. This advantage is accentuated when the cavities occupy all of the space between the two branches of the sipes.

In one alternative form of embodiment, the tread comprises at least one sipe extending in a rectilinear manner into the depth of the tread, referred to as a simple sipe. This simple sipe is positioned between two complex sipes, each of these complex sipes flanking a cavity. The simple sipe extends into the depth of the tread but not beyond half of the height of the cavities.

By adding simple sipes to the tread additional edge corners are created and the effect of biting into the snow at the beginning of life of the tire is accentuated. Because these simple sipes extend partially into the depth of the tread, they will not reduce the rigidity of the ribs generated by the cavities at the end of life. The invention therefore makes it possible to obtain a tread that has good snow grip at the beginning of life without impairing this performance at the end of life.

In one alternative form of embodiment, the simple sipes and the complex sipes extend over the surface of the tread in the new state, in respective directions of extension, each of these directions of extension having a circumferential component and/or an axial component. The number obtained by calculating the ratio between the sum of the axial components of the simple sipes and of the complex sipes to the surface area of the contact patch is greater than 110 micrometers/mm$^2$.

In that way, the grip of the tread at the start of life is optimized.

In one alternative form of embodiment, the blocks form, on the tread, a tread pattern of overall V-shape giving this tread a preferred direction of running.

The lateral walls of the blocks form edge corners with the contact faces of these blocks. These edge corners contribute to the grip of the tread both at the beginning of life and at the end of life. By giving the blocks of the tread a V shape, the length of the edge corners of the blocks is increased and the grip on snowy road surfaces is improved accordingly.

In one preferred embodiment, the tread comprises protuberances, each protuberance projecting from the bottom of a cavity, the height of this protuberance corresponding to at least one sixth of the height of the cavity.

In this way, stones are prevented from becoming lodged in the cavities as they appear on the tread surface. Thus the risk of mechanical damage to the bottom of the cavities and to the internal reinforcing structure of the tire is limited.

BRIEF DESCRIPTION OF THE DRAWINGS

Other features and advantages of the invention will become apparent from the following description given by way of nonlimiting example with reference to the attached drawings in which.

In the description which will follow, elements which are substantially identical or similar will be denoted by identical references.

DETAILED DESCRIPTION OF SPECIFIC EMBODIMENTS

Figure 1:
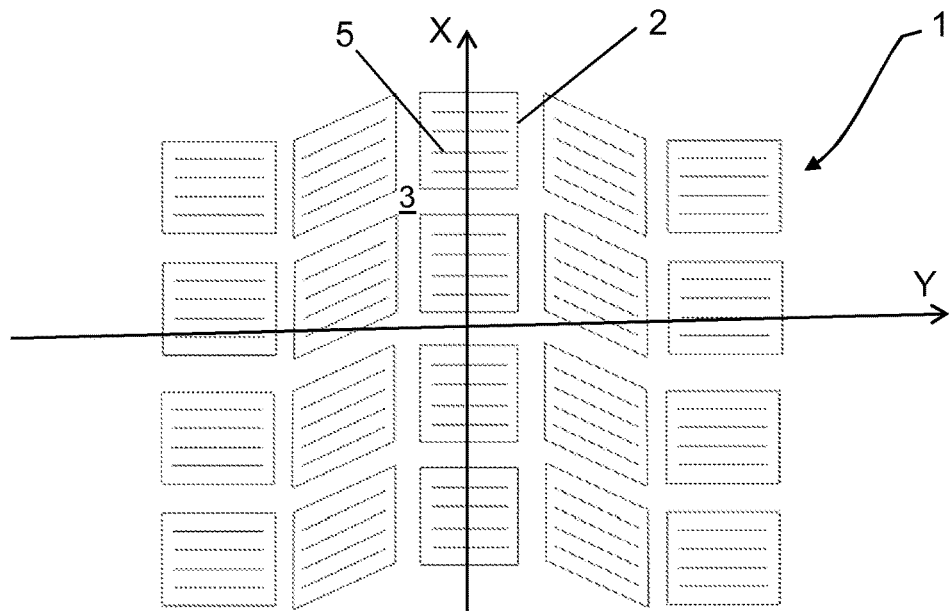
FIG. 1 depicts a partial view of the tread surface of a tread in the new state, according to an embodiment of the invention.

FIG. 1 depicts a partial view of the tread surface of a tread 1 in the new state, according to an embodiment of the invention.

This tread comprises a plurality of blocks 2 delimited by grooves 3. Each block 2 comprises a plurality of sipes 5 opening onto the tread surface of the tread. Each sipe extends over this tread surface in a given direction of extension. This direction of extension has a circumferential component, namely a component along the circumferential axis X, and an axial component, namely a component along the axial axis Y. Depending on the values adopted by the circumferential component and by the axial component, the sipe is said either to be transverse (zero circumferential component) or circumferential (zero axial component) or oblique (non-zero circumferential and axial components).

It will be noted that the blocks 2 here constitute a tread pattern with the overall shape of a V, giving the tread 1 a preferred direction of running.

Figure 2:
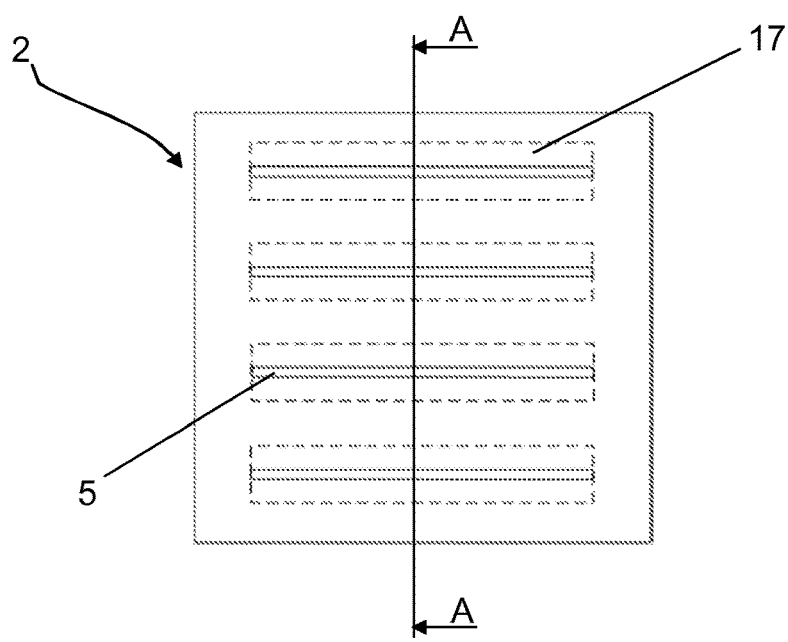
FIG. 2 depicts a block of the central part of the tread of FIG. 1.

FIG. 2 is an enlarged view of a block 2 of the central part of the tread illustrated in FIG. 1.

This FIG. 2 shows, in dotted line, cavities 17 arranged inside the block 2, respectively in the continuation of the sipes 5.

Figure 3:
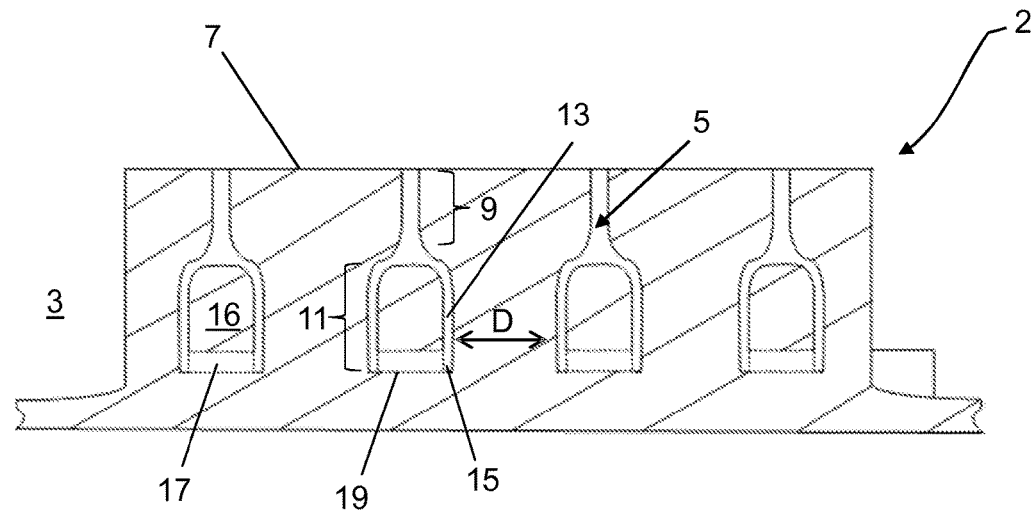
FIG. 3 schematically depicts a view in cross section of the block of FIG. 2.

FIG. 3 is a view in cross section of the block 2 of FIG. 1, on the line A-A of that figure. In this figure, it may be seen that the sipe 5 divides into several parts from a certain depth onwards. This sipe 5 will be referred to as a complex sipe in the remainder of the description. This complex sipe 5 thus comprises a rectilinear first part 9 and a second part 11 that extends the first part 9. The first part 9 extends radially from the tread surface 7 of the tread over a depth of between 10% and 60% of the thickness E of the tread in the new state. The second part 11 of the sipe 5 comprises at least two branches 13 flanking a volume. In the example of FIG. 1, this volume comprises a volume of rubber 16 and a void volume 17 forming a cavity in the tread. In order to make the invention easier to understand, the boundaries of this cavity 17 have been drawn in dotted line. The cavity 17 thus extends between the branches 13 of the complex sipe. More particularly, the cavity comprises a bottom 19 situated at the same level as the ends 15 of the branches 13.

It will be noted that in FIGS. 1 and 2, the complex sipe 5 does not extend over the entire length of the block 1. Thus, the volume of rubber 16 in FIG. 3 is attached by its ends to the rest of the block. That allows the volume of rubber 16 to be kept above the cavity 17, as depicted in FIG. 3.

Figure 4:
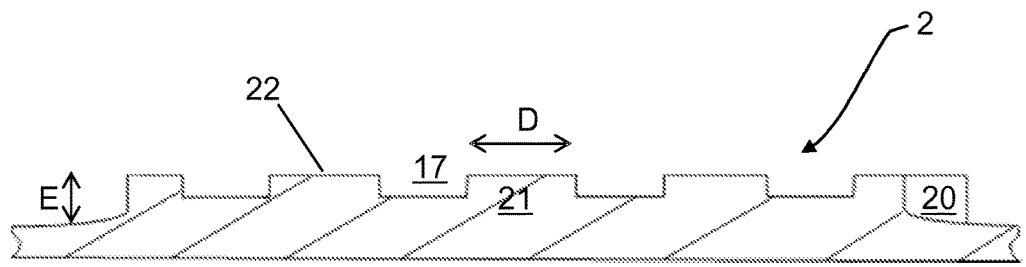
FIG. 4 schematically depicts a view in cross section of the block of FIG. 2, in the worn state.

FIG. 4 is a view in cross section of the block 2 when the tread is at the end of its wearing life. In that condition, the thickness E of the tread corresponds to the height of a wear indicator 20. In the example of a tread for a passenger vehicle, the height of the wear indicator is 1.6 mm. In FIG. 4, the cavities 17 of the tread delimit ribs of rubber 21. Each rib comprises a contact surface 22 intended to come into contact with the road surface during running.

It will be noted that the width D of each rib corresponds, in FIG. 1, to the distance between two branches of two adjacent complex sipes. This width D is at least equal to 2 mm.

Figure 5:
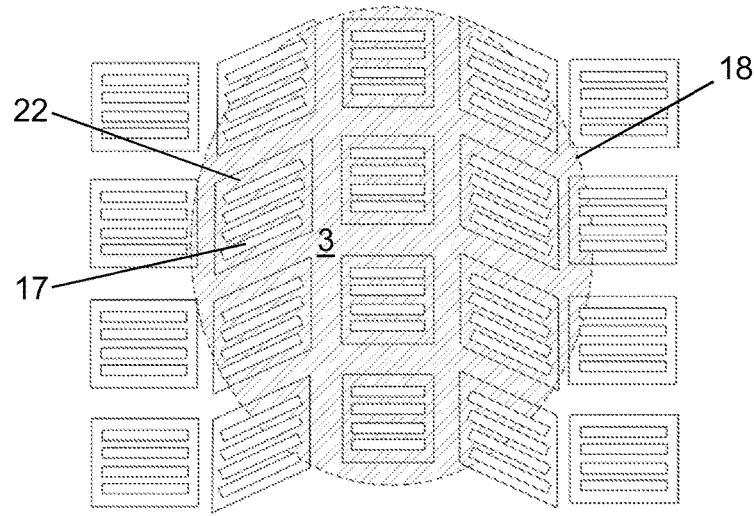
FIG. 5 depicts a partial view of the tread surface of the tread of FIG. 1, in the worn state.

FIG. 5 depicts a partial view of the tread surface of the tread 1 at the end of its wearing life.

In this figure, the boundaries 18 of a contact patch formed where the tread is in contact with the road surface at a given moment during running has been indicated in dotted line. From this contact patch it is possible to determine a contact patch area. This area (hatched in FIG. 5) corresponds to the surface area delimited by the boundaries 18 of the contact patch, this surface area being determined in the plane of the tread surface of the tread.

In FIG. 5, the cavities 17 and the grooves 3 generate voids in the tread. These voids can be quantified by determining the voids surface ratio of the tread. This voids surface ratio corresponds to the number obtained by calculating the ratio between, on the one hand, the difference between the area of the contact patch and the area of the contact surfaces 22 of the ribs contained in the contact patch and, on the other hand, this area of the contact patch. In the invention, the grooves 3 and the cavities 17 are configured so that the voids surface ratio of the tread at the end of its wearing life is greater than or equal to 35%.

Figure 6:
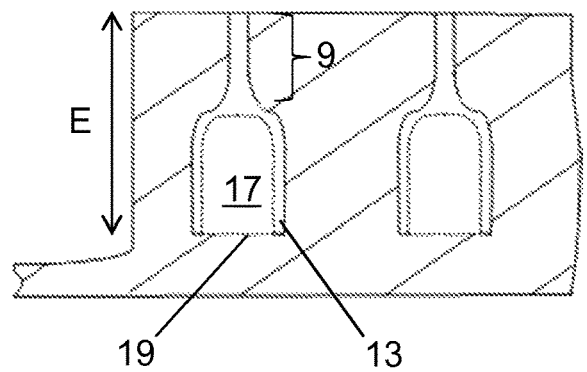
FIG. 6 depicts a partial view in cross section of the block of FIG. 2, according to a second embodiment.

FIG. 6 depicts a second embodiment of the invention, in which the cavity 17 extends from its bottom 19 as far as the rectilinear first part 9 of the complex sipe. Thus, in this embodiment, the volume arranged between the two branches of the complex sipe is entirely occupied with void.

Figure 7:
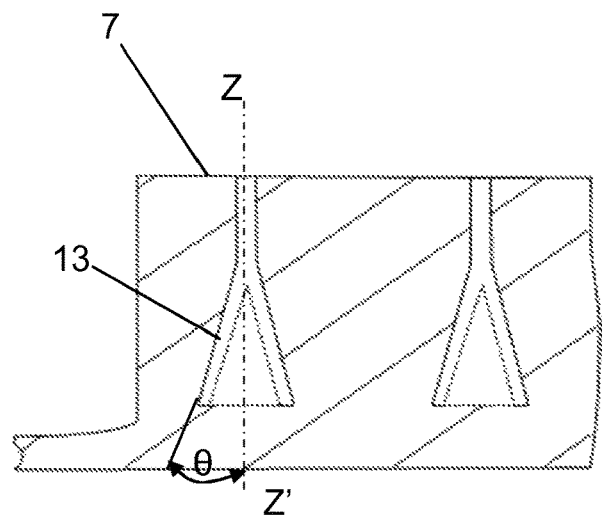
FIG. 7 depicts a partial view in cross section of the block of FIG. 2, according to a third embodiment.

FIG. 7 depicts a third embodiment of the invention, in which the branches 13 of the complex sipe are rectilinear and are symmetric about a plane Z-Z' orthogonal to the tread surface 7 of the tread. Each branch 13 makes an angle θ at most equal to 20° with the plane Z-Z'.

Figure 8:
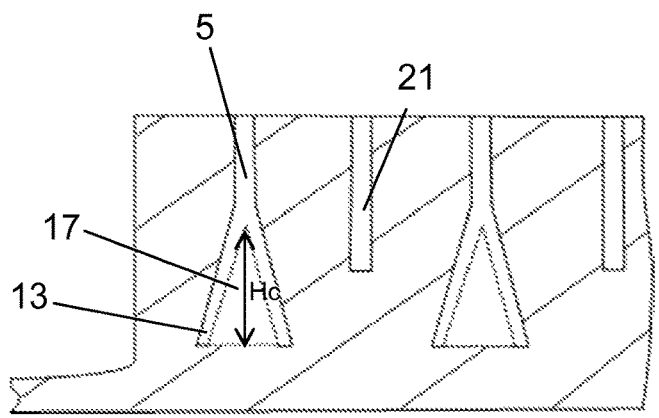
FIG. 8 depicts a partial view in cross section of the block of FIG. 2, according to a fourth embodiment.

FIG. 8 depicts an alternative form of embodiment of FIG. 7 in which the tread comprises sipes 21 extending in a rectilinear manner into the depth of the tread. These sipes 21 are referred to in the remainder of the description as simple sipes. Each simple sipe 21 is arranged between two complex sipes 5 and each complex sipe flanks a cavity 17 which in this instance occupies all of the volume between the branches 13 of the sipe. The simple sipe 21 extends partially into the depth of the tread. More specifically, the simple sipe does not extend beyond half the height Hc of the cavities.

It will be noted that the complex sipes 5 and the simple sipes 21 are configured in such a way that the ratio between the sum of the axial components of the simple sipes and of the complex sipes on the tread in the new state to the surface area of the contact patch is greater than 110 micrometers/mm².

Figure 9:
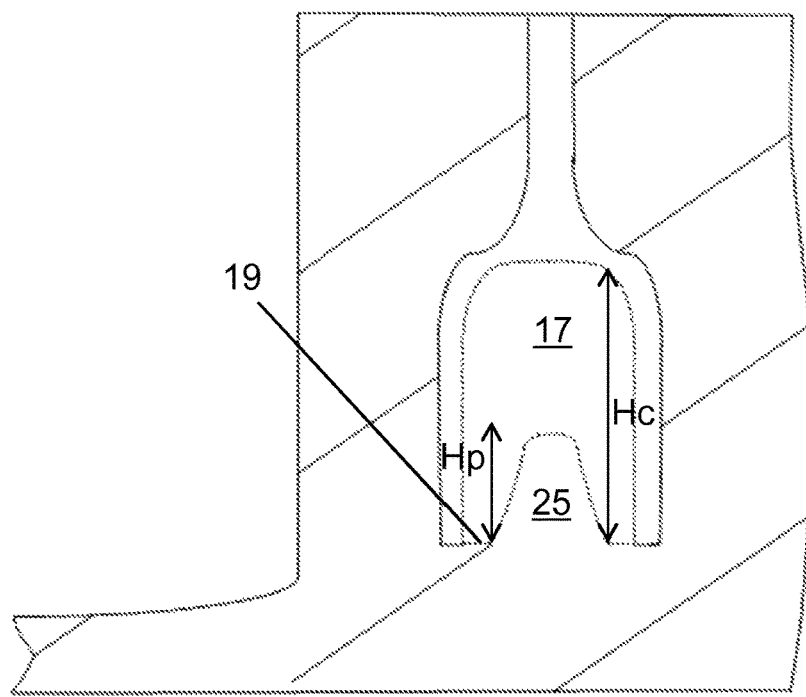
FIG. 9 depicts a partial view in cross section of the block of FIG. 2, according to a fifth embodiment.

FIG. 9 depicts a fifth embodiment of the invention in which the tread comprises protuberances 25 projecting from the bottom 19 of a cavity 17. The height Hp of this protuberance corresponds to at least one sixth of the height Hc of the cavity.

Figure 10:
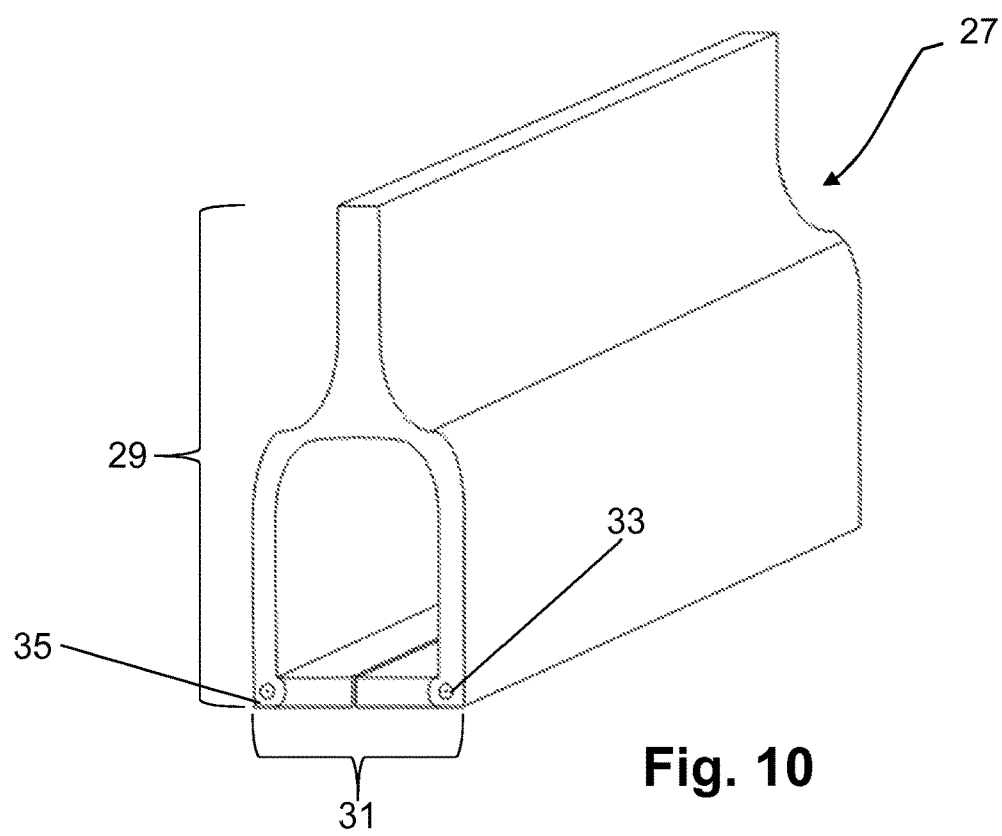
FIG. 10 depicts a moulding element that can be placed in a vulcanizing mould for moulding a complex sipe and a cavity associated with this sipe, according to the embodiment of FIG. 3.

FIG. 10 depicts a moulding element 27 able to mould one of the complex sipes 5 of FIG. 3. This moulding element 25 comprises a main part 29 and secondary parts 31. The main part 29 of the moulding element has a Y-shaped cross section and is intended to mould a complex sipe 5. The secondary parts are parallelepipedal overall and are intended to mould a cavity 17. More particularly, the secondary parts are mounted articulated by means of pivot pins 33 to, respectively, ends 35 of the main part 29. The moulding element 27 is depicted here in a condition in which it is able to mould the complex sipe and the cavity during a moulding operation. During a demoulding operation there is a desire to extract the moulding element 27 from the tire. To make this extraction easier, the secondary parts 31 of this moulding element will pivot gradually about the pivot pins 33 to align with the main part 29 of the moulding element, and will do so progressively as the mould gradually opens.

The invention is not restricted to the examples described and depicted and various modifications can be made thereto without departing from its scope.

Thus, in FIGS. 1 and 2, the sipes 5 have been depicted as continuous cuts. As an alternative, it is possible to align several shorter sipes 5 one after another.

Furthermore, in FIG. 7, the branches of the complex sipes have been depicted as being symmetric about the axis Z-Z'. As an alternative, it is possible for these branches not to be symmetric. Likewise, the lengths of the branches of one and the same complex sipe have been chosen in FIG. 7 to be identical. As an alternative, these branch lengths could be different. In another alternative form, it is possible for one and the same complex sipe to combine branches of different shapes, such as, for example, a rectilinear branch extending the rectilinear first part of the complex sipe with a branch having a shape for connection with this rectilinear first part that is identical to the branches of the sipes disclosed in the example of FIG. 3. All combinations of branch shape are possible.

In addition, in an alternative form of FIG. 8, it is possible to add a simple sipe 21 between the edge of the block and the complex sipe 5. The distance between this simple sipe and this block edge will need to be selected so that it does not excessively weaken this block mechanically.

Finally, in FIG. 3, the cavities have been depicted as opening into the branches 13 of the sipes. As an alternative, it is possible for these cavities to extend respectively between the branches of the sipe associated with this cavity without opening into these branches. Portions of material then exist between the cavities and the branches.

The invention claimed is:

1. A tread for a snow tire comprising:
a plurality of blocks separated by grooves, wherein the blocks are provided with sipe incisions dividing into several parts from a certain depth onwards, referred to as complex sipes, each complex sipe having, when viewed in cross section, a rectilinear first part extending radially from the tread surface of the tread, and a second part extending the first part and comprising at least two branches each having an end,
cavities, each cavity extending between the branches of a complex sipe, each cavity comprising a bottom wall which, in a radial direction, is entirely situated closer to the ends of the branches than to the rectilinear first part,
wherein the cavities and the grooves of the tread are configured so that the tread has a voids surface ratio at the end of wear greater than or equal to 35%, and wherein the distance (D) between two branches of two adjacent complex sipes is at least equal to 2 mm;
wherein each of the complex sipes extends between opposite ends that are spaced from the grooves that separate the blocks; and
wherein each of the complex sipes includes a volume of rubber that is positioned in the second part and is located above the cavity and wherein ends of the volume of rubber is attached to the block.

2. The tread according to claim 1 wherein the bottom wall of each cavity extends linearly between the ends of the branches when viewed in cross-section.

3. The tread according to claim 1 wherein a plurality of the blocks are each surrounded on all sides by grooves.

4. The tread according to claim 3 wherein each of the blocks is rectangular or parallelogram shaped.

5. The tread according to claim 4 wherein said blocks are disposed in a plurality of rows that are spaced from one another in an axial direction including a center row of blocks that are rectangular in shape and including a row of blocks that are parallelogram in shape on each axial side of said center row.

6. The tread according to claim 1, wherein each cavity extends from its bottom wall as far as the rectilinear first part of the complex sipe flanking this cavity, this rectilinear first part extending into the tread over a depth of between 10% and 60% of the thickness (E) of the tread in a new state.

7. The tread according to claim 1, wherein the branches of the complex sipes are rectilinear and are symmetric about a plane (Z-Z') orthogonal to the tread surface of the tread, these branches making an angle θ at most equal to 20° with this plane.

8. The tread according to claim 1, wherein the tread further comprises at least one sipe extending in a rectilinear manner into the depth of the tread, referred to as a simple sipe, this simple sipe being positioned between two complex sipes, each of these complex sipes flanking a cavity, and in that the simple sipe extends into the depth of the tread but not beyond half of the height (Hc) of the cavities.

9. The tread according to claim 8, wherein the simple sipes and the complex sipes extend over the surface of the tread in a new state, in respective directions of extension, each of these directions of extension having a circumferential component (Cx), or an axial component (Cy), or both, and wherein the number obtained by calculating the ratio between the sum of the axial components (Cy) of the simple sipes and of the complex sipes to the surface area of the contact patch is greater than 110 micrometers/mm$^2$.

10. The tread according to claim 1, wherein the blocks form, on the tread, a tread pattern of overall V-shape giving this tread a preferred direction of running.

* * * * *